(12) United States Patent
Touchette et al.

(10) Patent No.: US 9,670,862 B2
(45) Date of Patent: Jun. 6, 2017

(54) FUEL INJECTOR CALIBRATION AND TRIMMING

(71) Applicant: Westport Power Inc., Vancouver (CA)

(72) Inventors: Alain M. J. Touchette, Vancouver (CA); Timothy N. Lennox, Coquitlam (CA)

(73) Assignee: WESTPORT POWER INC., Vancouver (CA)

( * ) Notice: Subject to any disclaimer, the term of this patent is extended or adjusted under 35 U.S.C. 154(b) by 51 days.

(21) Appl. No.: 14/717,883

(22) Filed: May 20, 2015

(65) Prior Publication Data

US 2016/0017832 A1 Jan. 21, 2016

Related U.S. Application Data

(63) Continuation of application No. PCT/CA2013/050887, filed on Nov. 20, 2013.

(30) Foreign Application Priority Data

Nov. 21, 2012 (CA) .................................. 2796614

(51) Int. Cl.
*G06F 19/00* (2011.01)
*F02D 41/24* (2006.01)
(Continued)

(52) U.S. Cl.
CPC ....... *F02D 41/2432* (2013.01); *F02D 19/024* (2013.01); *F02D 41/0027* (2013.01);
(Continued)

(58) Field of Classification Search
CPC .... B60W 2710/0627; F02D 2200/0618; F02D 41/22; F02D 19/0623
(Continued)

(56) References Cited

U.S. PATENT DOCUMENTS 5,634,448 A    6/1997   Shinogle et al.
5,690,087 A *  11/1997  Schumacher ......... F02D 41/047
                                                123/675

(Continued)

FOREIGN PATENT DOCUMENTS

EP      1026384 A1    8/2000
EP      1750006 A3    12/2010
(Continued)

OTHER PUBLICATIONS

International Search Report of the International Searching Authority issued on Jan. 24, 2014, in connection with International Application No. PCT/CA2013/050887.
(Continued)

*Primary Examiner* — John Kwon
(74) *Attorney, Agent, or Firm* — Carie C. Mager; C. Larry Kyle

(57) ABSTRACT

A method for correcting injection behavior of a fuel injector includes calculating a nominal value of a fuel injector family characteristic for an average fuel injector from a family of fuel injectors as a multi-variable function of engine operating conditions, calculating a corrected value of the fuel injector family characteristic as a function of the nominal value, and employing the corrected value when actuating the fuel injector to inject fuel.

20 Claims, 5 Drawing Sheets

(51) Int. Cl.

| | | |
|---|---|---|
| *F02M 21/02* | (2006.01) | |
| *F02D 19/02* | (2006.01) | |
| *F02D 41/38* | (2006.01) | |
| *F02M 57/02* | (2006.01) | |
| *F02M 65/00* | (2006.01) | |
| *F02D 35/02* | (2006.01) | |
| *F02D 41/00* | (2006.01) | |

(52) U.S. Cl.
CPC ....... *F02D 41/248* (2013.01); *F02D 41/2467* (2013.01); *F02D 41/3845* (2013.01); *F02M 21/0245* (2013.01); *F02M 57/025* (2013.01); *F02M 65/00* (2013.01); *F02D 35/023* (2013.01); *F02D 41/0025* (2013.01); *F02D 2200/0602* (2013.01); *Y02T 10/32* (2013.01)

(58) Field of Classification Search
USPC .................................. 701/101–105, 114, 115
See application file for complete search history.

(56) References Cited

U.S. PATENT DOCUMENTS

| | | | |
|---|---|---|---|
| 5,781,700 A * | 7/1998 | Puskorius | ........... F02D 41/1405 706/14 |
| 5,839,420 A | 11/1998 | Thomas | |
| 6,112,720 A | 9/2000 | Matta | |
| RE37,807 E | 7/2002 | Shinogle et al. | |
| 6,516,773 B2 | 2/2003 | Dutart et al. | |
| 7,025,047 B2 | 4/2006 | Leman et al. | |
| 7,027,910 B1 * | 4/2006 | Javaherian | .......... F02D 41/0085 123/406.24 |
| 7,628,146 B2 | 12/2009 | Kloppenburg et al. | |
| 7,900,605 B2 | 3/2011 | Dingle | |
| 8,260,526 B2 | 9/2012 | Loeffler et al. | |
| 2003/0079723 A1 | 5/2003 | Mollin | |
| 2003/0209235 A1 * | 11/2003 | Javaherian | .......... F02D 41/0085 123/674 |
| 2004/0158384 A1 | 8/2004 | Kuegel et al. | |
| 2004/0172212 A1 | 9/2004 | Itoh | |
| 2010/0116252 A1 * | 5/2010 | Fischer | ................ F02M 51/061 123/490 |

FOREIGN PATENT DOCUMENTS

| | | |
|---|---|---|
| EP | 2336534 A1 | 6/2011 |
| WO | 2006122427 A1 | 11/2006 |

OTHER PUBLICATIONS

International Preliminary Report on Patentability issued on Feb. 24, 2015, in connection with International Application No. PCT/CA2013/050887.
Canadian Office Action issued on Mar. 7, 2013, in connection with the priority Canadian Patent Application No. 2,796,614.
Canadian Office Action issued on Jul. 2, 2013, in connection with the priority Canadian Patent Application No. 2,796,614.
Canadian Office Action issued on Nov. 18, 2013, in connection with the priority Canadian Patent Application No. 2,796,614.
Search Report issued by EPO on Jun. 22, 2016 in connection with co-pending Europe Application No. 13856942.1.

* cited by examiner

FUEL INJECTOR CALIBRATION AND TRIMMING

CROSS-REFERENCE TO RELATED APPLICATIONS

This application is a continuation of International Application No. PCT/CA2013/050887 having a filing date of Nov. 20, 2013, entitled "Fuel Injector Calibration and Trimming", which is related to and claims priority benefits from Canadian patent application No. 2,796,614 filed on Nov. 21, 2012, also entitled "Fuel Injector Calibration and Trimming". This application also claims priority benefits from the '614 application. The '887 international application is hereby incorporated by reference herein in its entirety.

FIELD OF THE INVENTION

The present application relates to a technique for calibrating gaseous fuel injectors after assembly and trimming the same during operation in an internal combustion engine.

BACKGROUND OF THE INVENTION

Combustion control is an important factor in optimizing fuel economy and performance in internal combustion engines. The amount of fuel introduced to the combustion chamber and the timing when that fuel is introduced contributes to the quality of combustion at given engine operating conditions. Fuel injectors are capable of introducing specific amounts of fuel at a given time by way of an actuation signal that originates in an engine controller. However, fuel injectors are multi-part mechanical components with moving pieces that exhibit performance variations from part to part, due to design factors and dimensional variances, even when the fuel injectors are made within specified manufacturing tolerances. When fuel injectors are activated with a nominal actuation signal the amount of fuel injected and the timing of when that fuel is introduced can be different from one injector to another injector.

There are known techniques for correcting performance variations in fuel injectors. These techniques address fuel injectors that introduce a liquid fuel, such as Diesel, to the combustion chamber. In a calibration phase during manufacturing, each fuel injector is actuated with a variety of actuation signals as a function of liquid rail pressure such that the actual quantity of fuel injected and other fuel injector characteristics can be measured and compared against set point values such that correction factors are identified. A bar code or other means on the fuel injector stores the correction factors, also known as trim information, such that when the fuel injector is installed in an engine the engine controller can be programmed with these values.

In the case of hydraulically actuated fuel injectors that introduce both a pilot fuel and a gaseous fuel, separately and independently, the quantity of gaseous fuel introduced by the injector and its timing is a function of more than just liquid rail pressure. For example, both the pilot (liquid) fuel rail pressure and gaseous fuel rail pressure influence injector performance. In liquid fuel injection systems the rail pressure is significantly higher than cylinder pressure in order to atomize the fuel during injection, for example diesel common rail pressure can be in the range 1000 bar to 1800 bar, and even higher. The differential pressure between in-cylinder pressure and liquid rail pressure is of a sufficiently large magnitude that the influence of in-cylinder pressure variations on injector performance is insignificant. However, when injecting a gaseous fuel directly into a combustion chamber, in-cylinder pressure variations can influence injector performance when gaseous fuel rail pressure is substantially less than liquid fuel rail pressure. There are a variety of reasons for designing a gaseous fuel injector to operate with a lower gaseous fuel rail pressure, for example between 100 bar and 500 bar. For instance, atomization is not required for a gaseous fuel so there is no motivation to increase gaseous rail pressure for this reason. Compressing a gaseous fuel, a compressible substance, requires more energy than compressing a liquid fuel, an incompressible substance, so the desire to maximize engine efficiency favors using a lower gaseous fuel rail pressure, as long as the pressure is high enough to inject the demanded quantity of fuel at corresponding engine operating conditions. It is with this objective in mind, that fuel injectors can be designed with the needed flow capacity at lower pressures. As a result, for many gaseous fuel injectors, the differential between in-cylinder pressure and gaseous rail pressure is of a smaller magnitude compared to typical liquid fuel injectors. As a result, for gaseous fuel injectors, in-cylinder pressure variations can be a factor in injector performance.

Other parameters influencing injector performance are hydraulic fluid pressure and hydraulic pulse width. When activated by the nominal actuation signal, hydraulic fluid pressure decreases inside the injector actuating mechanisms to inject fuel. Because of the aforementioned dimensional variances that are inevitably introduced during manufacturing, the injectors exhibit performance variations caused by changes in hydraulic fluid pressure, such as closing and opening times. As the desired on-time (hydraulic pulse width) for the injector decreases the variations in opening and closing time of the injector have an increased influence on the amount of fuel that is actually introduced. This influence is especially noticeable when the injector partially opens. The fuel flow area in an opened injector changes from injector to injector because of dimensional differences introduced by the manufacturing process which allows variations within specified tolerances. Therefore for identical hydraulic pulse widths (desired injector on-time) the amount of fuel that is actually introduced can be different from one injector to another injector even though both are manufactured in accordance with specifications.

Unlike a simpler monofuel injector that injects only one fuel, there are at least four parameters that influence fuel injector performance in a hydraulically-actuated gaseous fuel injector introducing both a pilot fuel and a gaseous fuel, separately and independently. These parameters are pilot fuel (liquid) rail pressure, gaseous fuel rail pressure, in-cylinder pressure and hydraulic pulse width. During the calibration phase using traditional liquid fuel trimming techniques, an increased number of test points are used for the gaseous fuel injector described above, due to the number of parameters influencing injector performance, compared to a conventional liquid fuel injector, resulting in a larger amount of fuel injector trim information.

Several techniques are known to store fuel injector trim information on the fuel injector that can later be programmed into an engine controller, such as on a bar code, a memory device or an integrated circuit. The information that needs to be stored can be accommodated by these techniques. Normally, during production the trim code is transferred to the engine controller by an automated method, such as by a bar code scanner or by RFID. There are times, however, when the trim code is entered manually, for example when a fuel injector is replaced in the field. Using conventional trimming techniques with the gaseous fuel injector described above resulted in large trim codes, due to the many test points used as a consequence of the multiple engine parameters influencing injector performance. Larger trim codes can be impractical and prone to error when entered manually by an operator.

U.S. Pat. No. 6,112,720, issued Sep. 5, 2000 to George M. Matta (the '720 patent) discloses a method of tuning hydraulically actuated fuel injectors based on electronic trim. The technique involves representing a difference in fuel delivery between a nominal fuel injector and an actual fuel injector as a linear relationship that is a function of liquid rail pressure. The nominal fuel injector is a theoretical perfectly performing injector without variations due to tolerancing or other manufacturing considerations. Since the relationship is assumed linear, two test conditions are used to determine equation (1) of the linear relationship from which constants a1 (y-intercept) and a2 (slope) are learned. The change in on time required for the actual fuel injector is then calculated according to equation (2) where the difference in fuel delivery is divided by the slope of the fuel delivery curve for the actual fuel injector. Since the slope of the actual fuel injector is not known the slope for the nominal fuel injector is employed instead. By substituting equation (1) into equation (2) the trimming solution, that is the adjustment in on-time for the actual fuel injector is derived according to equation (3).

The technique of the '720 patent has a number of approximations that introduce error into the trimming solution of equation (3) and limitations resulting in reduced injector performance. In a first approximation, in calculating the change in on-time for the actual injector according to equation (2) to compensate for the difference in fuel delivery between the actual and ideal injectors, the slope of the fuel delivery curve for the ideal (nominal) injector is employed instead of the slope of the fuel delivery curve for the actual injector which is not known. This introduces an error in the calculation since the correct slope to employ is that for the actual injector fuel delivery curve, which is different than the slope of the ideal injector fuel delivery curve. In a second approximation, a linear relationship is assumed to exist between the liquid rail pressure and the difference in fuel delivery between the ideal and actual injectors. As previously discussed, the performance of a hydraulically actuated fuel injector that injects a gaseous fuel, or a gaseous fuel and a liquid fuel, is dependent upon multiple engine operating parameters. Accordingly, the difference in fuel delivery of such a gaseous fuel injector and a nominal injector is not a simple linear relationship of engine operating conditions.

The '720 patent does not disclose any solution for correcting for differences in start of injection timing between the nominal fuel injector and actual fuel injectors. Errors in start of injection directly contribute to reduced combustion performance. The '720 patent does propose a technique for adjusting on-time of an actual fuel injector to correct for fuel delivery variations from the nominal injector. The technique does not correct for the non-linear behavior of fuel injector performance as the commanded on-time decreases and approaches the opening and closing times of the injector. Yet another limitation of the technique of '720 patent is the reliance upon an ideal (nominal) fuel injector as a starting position for fuel injector operation. An ideal (nominal) injector is employed to compare performance against an actual fuel injector and from which correction in on-time for the actual fuel injector is derived. In reality there is no such ideal fuel injector since the injectors exhibit dimensional variations due to tolerances allowed in manufacturing. In the event a trimming solution for an actual fuel injector is not found, for example trim information was not entered during a fuel injector replacement in the field then the on-time for the nominal injector is employed. However, the performance of an ideal injector is not the same as the performance of an average injector, for example the average injector from a lot of manufactured injectors.

The state of the art is lacking in techniques for generating fuel injector trim information during calibration of gaseous fuel injectors whose performance is influenced by a plurality of engine operating parameters. The present method and apparatus provide an improved technique for generating and using fuel injector trim information in an internal combustion engine.

SUMMARY OF THE INVENTION

It has been observed that actuating an actual injector with the on-time of the ideal injector, when trim information is not employed, statistically provides reduced accuracy compared to the present technique.

An improved method for correcting injection behavior of a fuel injector comprises calibration phases and a trimming phase. In a fuel injector family calibration phase performed at least once for a family of fuel injectors, the method comprises (a) operating a set of fuel injectors from the family of fuel injectors at a first predetermined number of engine operating conditions; and determining a multi-variable function of engine operating conditions based on measurements of performance of the set of fuel injectors; the multi-variable function of the engine operating conditions determining a nominal value of a fuel injector family characteristic. In a fuel injector calibration phase performed during manufacturing, the method comprises (b) operating a fuel injector at a second predetermined number of engine operating conditions; and determining a function of the nominal value based on measurements of performance of the fuel injector, the function of the nominal value determining a corrected value of the fuel injector family characteristic for the fuel injector. In a fuel injector trimming phase during operation in an internal combustion engine, the method comprises (c) operating the fuel injector at respective engine operating conditions; calculating the nominal value of the fuel injector family characteristic from the multi-variable function of the engine operating conditions; calculating the corrected value of the fuel injector family characteristic from the function of the nominal value; and employing the corrected value when actuating the fuel injector to inject fuel. The above method can further comprise performing steps (a), (b) and (c) for a pilot fuel and for a main fuel.

In the fuel injector family calibration phase during manufacturing, the method can further comprise for each fuel injector and engine operating condition measuring performance of the fuel injector when injecting; and determining an actual value of the fuel injector family characteristic as a function of the measurements of the performance; grouping the engine operating conditions and the actual values for each fuel injector into a set of points; and determining the multi-variable function of the engine operating conditions by employing surface fitting techniques on the sets of points.

In the fuel injector calibration phase during manufacturing, the method can further comprise for each engine operating condition measuring performance of the fuel injector when injecting; determining an actual value of the fuel injector family characteristic as a function of the measurements of the performance; and calculating the nominal value of the fuel injector family characteristic from the multi-variable function of the engine operating conditions; grouping the actual value and the nominal value for each engine operating condition into a set of points; determining the function of the nominal value by employing curve fitting techniques on the set of points; determining parameters representative of the function of the nominal value; and associating the parameters with the fuel injector.

An improved method for correcting injection behavior of a fuel injector comprises calculating a nominal value of a fuel injector family characteristic as a multi-variable function of engine operating conditions; calculating a corrected value of the fuel injector family characteristic as a function of the nominal value; and employing the corrected value when actuating the fuel injector to inject fuel. The nominal value is an average value for a fuel injector from a family of fuel injectors taking into consideration dimensional variations due to tolerancing or other manufacturing considerations. In a preferred embodiment the calculations for the nominal value and the corrected value are determined in real-time while the engine in which the fuel injector is installed is operating. These calculations are performed for each fuel injector installed in the engine since each fuel injector is calibrated uniquely and independently of other fuel injectors, according to the technique described herein. That is, the function of the nominal value is unique for each fuel injector. The engine operating conditions comprise at least gaseous fuel rail pressure, liquid fuel rail pressure and cylinder pressure, and additionally can comprise hydraulic pulse width. The fuel injector family characteristic can be one of opening delay, closing delay and hydraulic pulse width. The injection behavior for the fuel injector can be corrected by determining corrected values for each of the opening delay, closing delay and hydraulic pulse width. The fuel injector can be a gaseous fuel injector designed for injecting an accurately metered quantity of gaseous fuel, or a fuel injector designed for injecting accurately metered quantities of gaseous fuel and liquid fuel respectively.

The multi-variable function can be derived by operating a set of fuel injectors from the family of fuel injectors at a predetermined number of engine operating conditions, and for each fuel injector and engine operating condition measuring at least three engine parameters from the group containing gaseous fuel rail pressure, liquid fuel rail pressure, cylinder pressure and hydraulic pulse width; and measuring the nominal value of the fuel injector family characteristic; grouping the engine parameters and the nominal value for each fuel injector and engine operating condition into a set of points; and employing curve fitting techniques on the set of points to determine the multi-variable function of the engine operating conditions.

The function of the nominal value can comprise a first equation of a first line representative of a relationship between the nominal value and the corrected value. The first equation of the first line is characterized by coefficients, whereby the coefficients are associated with the fuel injector. In a preferred embodiment the first equation is an equation for a straight line characterized by coefficients comprising a slope and a y-intercept. The method can further comprise determining the slope and the y-intercept during fuel injector calibration and associating the slope and the y-intercept with the fuel injector. The function of the nominal value can further comprise a second equation of a second line representative of a relationship between the nominal value and the corrected value, such that the first equation is representative of a high load and/or speed region and the second equation is representative of a low load and speed region of the engine operating conditions. When an engine operating condition is between the low load and speed region and the high load and/or speed region, the method further comprises interpolating between corresponding corrected values in the low load and speed region and the high load and/or speed region to determine the corrected value.

An improved apparatus for correcting injection behavior of a fuel injector comprising an electronic controller operatively connected with the fuel injector and programmed to (a) calculate a nominal value of a fuel injector family characteristic for a family of fuel injectors from a multi-variable function of engine operating conditions, the multi-variable function of engine operating conditions determined in a fuel injector family calibration phase performed at least once for the family of fuel injectors; (b) calculate a corrected value of the fuel injector family characteristic for the fuel injector from a function of the nominal value; the function of the nominal value determined during a fuel injector calibration phase during manufacturing; and (c) employ the corrected value when actuating the fuel injector to inject fuel.

In a preferred embodiment the fuel injector is the type that injects a pilot fuel and a main fuel, which can be actuated to introduce the pilot fuel separately and independently from the main fuel. The electronic controller can be programmed to perform steps (a), (b) and (c) for the pilot fuel and for the main fuel.

An improved apparatus for correcting injection behavior of a fuel injector comprises an electronic controller operatively connected with the fuel injector and programmed to calculate a nominal value of a fuel injector family characteristic as a multi-variable function of engine operating conditions; calculate a corrected value of the fuel injector family characteristic as a function of the nominal value; and employ the corrected value when actuating the fuel injector to inject fuel. The apparatus further comprises a recording apparatus connected with the fuel injector and storing information relating the fuel injector family characteristic with the corrected value.

The function of the nominal value comprises a first equation of a first line representative of a relationship between the nominal value and the corrected value. The first equation of the first line is characterized by coefficients, which are stored in the recording apparatus. In a preferred embodiment the first equation is an equation of a straight line characterized by coefficients comprising a slope and a y-intercept, whereby the slope and the y-intercept are stored in the recording apparatus.

An improved method for correcting injection behavior of a fuel injector comprises employing corrected values for opening delay and closing delay when actuating the fuel injector to inject fuel. The opening delay corrected value is determined in two principle steps comprising calculating an opening delay nominal value representative of opening delay for a family of fuel injectors as a first multi-variable function of engine operating conditions; and calculating the opening delay corrected value as a function of the opening delay nominal value. The closing delay corrected value is determined in two principle steps comprising calculating a closing delay nominal value representative of closing delay for the family of fuel injectors as a second multi-variable function of engine operating conditions; and calculating a closing delay corrected value as a function of the closing delay nominal value.

A method of calibrating a fuel injector after its manufacture and prior to installation in an engine where calibration information is determined and later employed to correct the actuation of the fuel injector comprises the steps of arranging the fuel injector in a testing apparatus; operating the fuel injector at a predetermined number of engine operating conditions; measuring an operating characteristic for the fuel injector at each engine operating condition; calculating corresponding nominal values of each of the operating characteristics that are representative of a family of the fuel injector as a multi-variable function of the engine operating conditions; grouping corresponding operating characteristics and nominal values into a set of points; employing curve fitting techniques to determine an equation representative of the set of points, the equation characterized by at least one or more coefficients; and associating calibration information comprising the coefficients with the fuel injector.

An improved method of calibrating a fuel injector after its manufacture and prior to installation in an engine is provided. Trim information is determined during calibration and later employed when operating the fuel injector in the engine to correct actuation of the fuel injector. The fuel injector is arranged in a testing apparatus and operated at a predetermined number of engine operating conditions. An operating characteristic for the fuel injector is measured at each engine operating condition. Nominal values corresponding to each operating characteristic and representative of an average fuel injector from a family of the fuel injector are calculated as a multi-variable function of the engine operating conditions. The corresponding operating characteristics and nominal values are grouped into a set of points. Curve fitting techniques are employed to determine an equation representative of the set of points. The equation is characterized by at least one coefficient. Trim information comprising the at least one coefficient is associated with the fuel injector.

An improved apparatus for correcting injection behavior of a fuel injector is provided. An electronic controller operatively connected with the fuel injector is programmed to (1) calculate a nominal value of a fuel injector family characteristic for an average fuel injector from a family of fuel injectors as a multi-variable function of engine operating conditions, (2) calculate a corrected value of the fuel injector family characteristic as a function of the nominal value, and (3) employ the corrected value when actuating the fuel injector to inject fuel. The fuel injector can be a gaseous fuel injector designed for injecting an accurately metered quantity of gaseous fuel. The fuel injector can also be a fuel injector designed for injecting accurately metered quantities of gaseous fuel and liquid fuel respectively. A recording apparatus is connected with the fuel injector and stores information relating the fuel injector family characteristic with the corrected value.

DETAILED DESCRIPTION OF ILLUSTRATIVE EMBODIMENT(S)

Figure 1:
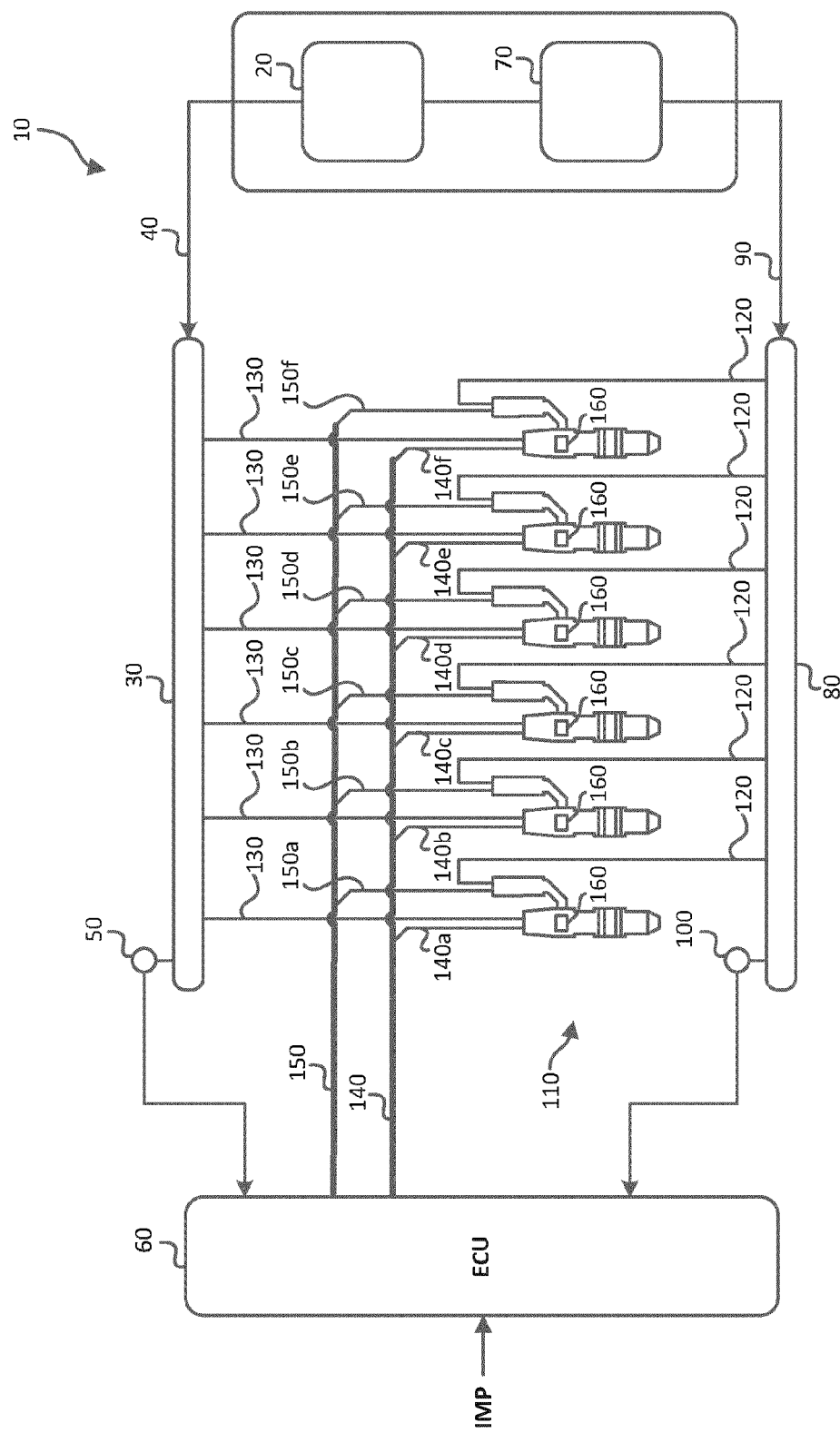
FIG. 1 is a schematic view of a fuel system according to one embodiment.

FIG. 1 shows fuel system 10 for a high pressure, direct injection internal combustion engine. Only the components relevant for the understanding of the present technique are shown; there are other components associated with a fuel system which are not shown. Although the disclosure herein is directed at a direct injection system, the technique described applies to any type of fuel injector. Gaseous fuel supply apparatus 20 delivers pressurized gaseous fuel to gas rail 30 through piping 40. In the present disclosure gas refers to gaseous fuel. Gaseous fuel pressure in rail 30 is monitored by pressure sensor 50 which sends a signal to electronic controller 60 such that the controller commands apparatus 20 to pump gaseous fuel to maintain the pressure in rail 30 at a set point pressure within a predetermined range of tolerance as a function of engine operating conditions. Liquid fuel supply apparatus 70 delivers pressurized liquid fuel to rail 80 through piping 90. The liquid fuel pressure in rail 80 is monitored by pressure sensor 100 which sends a signal to electronic controller 60 such that the controller commands apparatus 70 to pump liquid fuel to maintain the pressure in rail 80 at a set point pressure within a predetermined range of tolerance as a function of engine operating conditions. In other embodiments a bias pressure between gaseous fuel pressure in rail 30 and liquid fuel pressure in rail 80 can be mechanically controlled, for example by a dome loaded regulator, such that by controlling the pressure of one fuel the other is automatically determined by the bias pressure. As is understood by those familiar with the technology, there are other related techniques for controlling pressure in rails 30 and 80.

In some preferred embodiments, fuel injectors 110 are hydraulically actuated direct injectors that inject a pilot fuel and a main fuel, which can be actuated to introduce the pilot fuel separately and independently from the main fuel. In the present embodiment the pilot fuel is the liquid fuel in rail 80 delivered through piping 120 and the main fuel is the gaseous fuel in rail 30 delivered through piping 130. Control bus 140 from controller 60 comprises control lines 140a, 140b, 140c, 140d, 140e, 140f which actuate respective fuel injectors 110 to inject gaseous fuel. Similarly, control bus 150 from controller 60 comprises control lines 150a, 150b, 150c, 150d, 150e, 150f which actuate respective fuel injectors 110 to inject liquid fuel.

Figure 2:
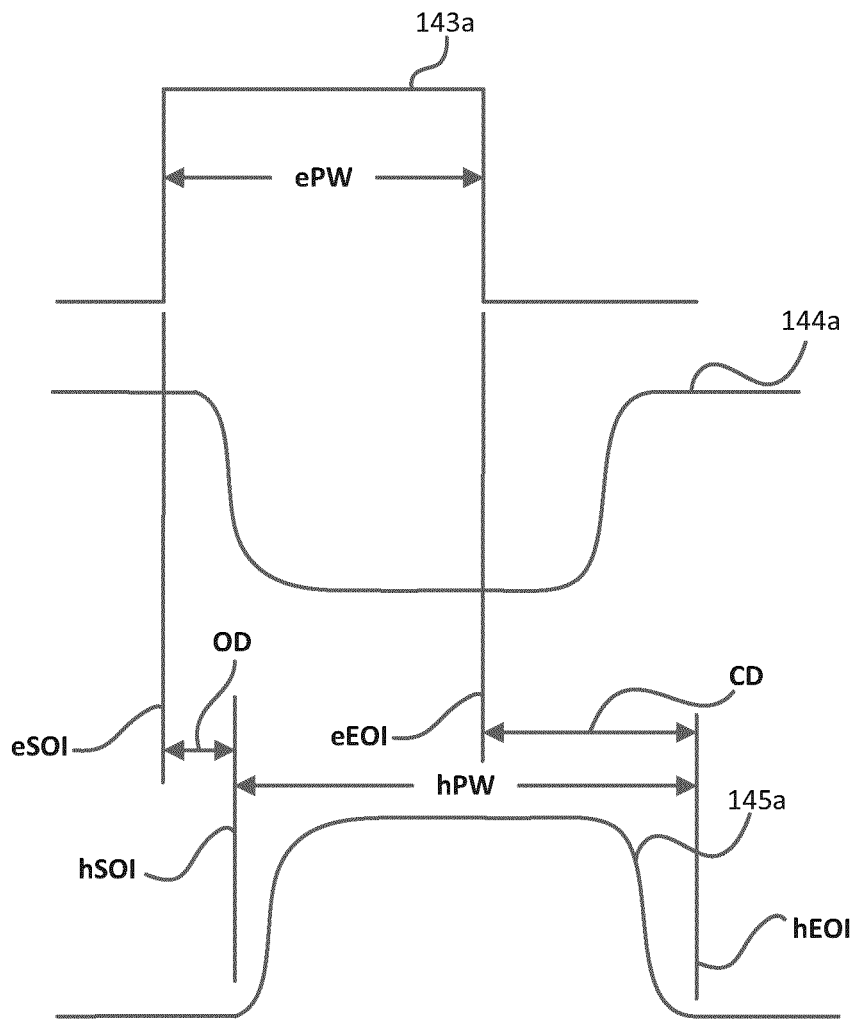
FIG. 2 is a plot of an electronic control signal, a corresponding hydraulic pressure signal employed to activate a fuel injector in the fuel system of FIG. 1, and a mass flow signal representing the rate of mass flow through the fuel injector due to the hydraulic pressure signal.

Referring now to FIGS. 1 and 2, the actuation of fuel injectors 110 is described in more detail in relation to control line 140a of one such fuel injector. Controller 60 (from FIG.

1) actuates the fuel injector to introduce gaseous fuel by generating control signal 143a (shown in FIG. 2) sent over control line 140a which energizes an actuator in the injector (not shown) to initiate a pressure change of hydraulic fluid characterized by hydraulic fluid pressure signal 144a. Control signal 143a is an electrical control signal shown in its ideal form, such as a voltage or current signal for example. Hydraulic fluid pressure signal 144a actuates mechanisms of the injector to introduce gaseous fuel into combustion chambers (not shown) of the internal combustion engine, and the mass flow of the gaseous fuel into the combustion chambers is illustrated in FIG. 2 as mass flow signal 145a. Mass flow signal 145a is representative of the rate of fuel flowing into the combustion chambers. Control signal 143a is characterized by electronic pulse width (ePW), and mass flow signal 145a is characterized by hydraulic pulse width (hPW). The timing for electronic pulse width (ePW) begins at the rising edge of control signal 143a indicated as electronic start of injection (eSOI). The timing for hydraulic pulse width (hPW) begins at the rising edge of mass flow signal 145a indicated as hydraulic start of injection (hSOI), and begins a period of time known as opening delay (OD) after electronic start of injection (eSOI). Hydraulic start of injection (hSOI), which is an important parameter to control for improved combustion quality, correlates to the time fuel starts flowing through the injector into the combustion chamber, in direct injector embodiments. For this reason it is advantageous to know the opening delay (OD) for each fuel injector such that the time when fuel is introduced can be known with improved accuracy. Similarly, closing delay (CD) is the timing difference between the falling edge of control signal 143a and the corresponding falling edge in mass flow signal 145a. Opening delay (OD) and closing delay (CD) are characteristics of each fuel injector that vary from injector to injector. For the purposes of this disclosure, in FIG. 2, it is arbitrary whether opening delay (OD) is greater than, equal to or less than closing delay (CD). Depending upon the design and operating characteristics of a particular fuel injector, as well as the engine system operating conditions, opening delay (OD) could be greater than, equal to, or less than closing delay (CD).

Fuel injectors exhibit other characteristics that vary from part to part. For a given hydraulic pulse width (hPW) the actual quantity of fuel delivered from each fuel injector varies from a nominal value for the family of fuel injectors for a variety of reasons, including the dimensional variances introduced by the permitted manufacturing tolerances. As used herein a family of fuel injectors comprises like fuel injectors. To compensate for this variation the hydraulic pulse width (hPW) can be corrected by increasing or decreasing the width. In the present disclosure the hydraulic pulse width is corrected by multiplying it by a correction factor called fuel trim (FTM). The present disclosure provides a technique to calibrate fuel injectors 110 such that a reduced amount of trim information is provided to electronic controller 60 whereby opening delay (OD), closing delay (CD) and fuel trim (FTM) can be determined for each fuel injector 110 as function of engine operating conditions as a function of the particular characteristics of each individual fuel injector.

Figure 3:
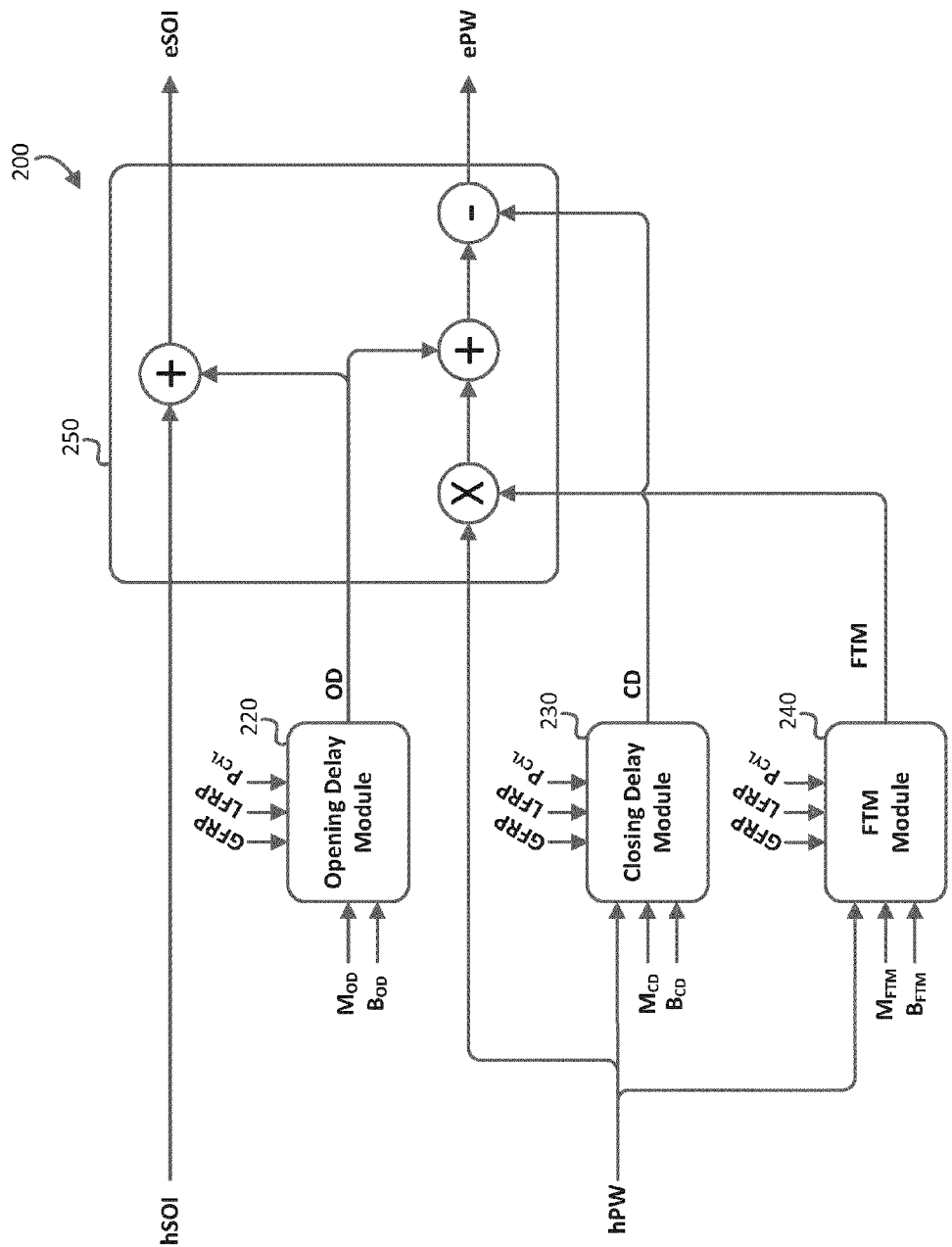
FIG. 3 is a schematic view of a fuel injector trim apparatus for the fuel system of FIG. 1.

Referring now to FIG. 3 fuel injector trim apparatus 200 comprises opening delay (OD) module 220, closing delay (CD) module 230, fuel trim (FTM) module 240 and correction module 250. As used herein, the terms module, algorithm and step refer to an application specific integrated circuit (ASIC), an electronic circuit, a processor (shared, dedicated, or group) and memory that execute one or more software or firmware programs, a combinational logic circuit, and/or other suitable components that provide the described functionality. In some preferred embodiments the modules, algorithms and steps herein are part of electronic controller 60. Apparatus 200 operates to determine electronic start of injection (eSOI) and electronic pulse width (ePW) based on a desired hydraulic start of injection (hSOI) and a desired hydraulic pulse width (hPW). Hydraulic start of injection (hSOI) and hydraulic pulse width (hPW) are nominal values for a nominal fuel injector and are determined as a function of engine operating conditions to achieve a desired nominal fueling at a desired nominal timing. For the purposes of this disclosure start of injection (SOI) refers to crank angle degrees (CA°) before top dead center (BTDC). Conventionally, controller 60 looks up in a map a corresponding electronic pulse width (ePW) as a function of hydraulic pulse width (hPW) and a corresponding electronic start of injection (eSOI) as a function of hydraulic start of injection (hSOI). In the present disclosure modules 220, 230 and 240 correct opening delay (OD), closing delay (CD) and hydraulic pulse width (hPW) respectively, such that electronic start of injection (eSOI) and electronic pulse width (eSOI) can be determined according to correction module 250.

Each module 220, 230 and 240 comprises a model representative of the family of fuel injectors 110 in the form of a multi-variable function that outputs a value as a function of engine operating conditions that is common to fuel injectors in that family. Referring first to opening delay module 220, Eqn. 1 below illustrates the multi-variable function that determines a value ($x_{OD}$) representative of the opening delay for an average fuel injector from the family of fuel injectors as a function of gaseous fuel rail pressure (GFRP), liquid fuel rail pressure (LFRP) and in-cylinder pressure ($P_{CYL}$). The derivation of the multi-variable function in EQN. 1 will be described in more detail below, in addition to the derivation of multi-variable functions EQNS. 3 and 5 discussed in relation to closing delay (CD) and fuel trim (FTM). The value ($x_{OD}$) can be a nominal opening delay for the average fuel injector from the family of fuel injectors, or can be a nominal value having dimensions (units) that have no physical meaning but which is correlated, and therefore representative of the nominal opening delay. A corrected value for opening delay (OD) for a particular fuel injector can be determined by substituting the value ($x_{OD}$) into EQN. 2, which is a function comprising constants ($m_{OD}$, $b_{OD}$) that are characteristic of the particular fuel injector. EQN. 1 represents a relationship for the family of fuel injectors 110, and EQN. 2 represents a relationship for the particular fuel injector. The constants ($m_{OD}$, $b_{OD}$) for each fuel injector are determined in a calibration phase during manufacturing. When the family of fuel injectors is the type that are hydraulically actuated direct injectors that inject a pilot fuel and a main fuel, which can be actuated to introduce the pilot fuel separately and independently from the main fuel, there are a set of EQN. 1 and EQN. 2 for the pilot fuel portion of the fuel injector and a set of EQN. 1 and EQN. 2 for the main fuel portion of the fuel injector. EQN. 1 for the pilot fuel may not be a function of GFRP.

$$x_{OD}=f(GFRP, LFRP, P_{cyl}) \qquad \text{EQN. 1}$$

$$OD=m_{OD}x_{OD}+b_{OD} \qquad \text{EQN. 2}$$

Referring now to closing delay module 230 in FIG. 3, Eqn. 3 below illustrates the multi-variable function that determines a value ($x_{CD}$) representative of the closing delay for the average fuel injector from the family of fuel injectors as a function of gaseous fuel rail pressure (GFRP), liquid fuel rail pressure (LFRP), in-cylinder pressure ($P_{CYL}$) and hydraulic pulse width (hPW). The value ($x_{CD}$) can be a nominal closing delay for the average fuel injector from the family of fuel injectors, or can be a nominal value having dimensions (units) that have no physical meaning but which is correlated, and therefore representative of the nominal closing delay. A corrected value for closing delay (CD) for a particular fuel injector can be determined by substituting the value ($x_{CD}$) into EQN. 4, which is a function comprising constants ($m_{CD}$, $b_{CD}$) that are characteristic of the particular fuel injector. EQN. 3 represents a relationship for the family of fuel injectors 110, and EQN. 4 represents a relationship for the particular fuel injector. The constants ($m_{CD}$, $b_{CD}$) for each fuel injector are determined in the calibration phase during manufacturing. When the family of fuel injectors is the type that are hydraulically actuated direct injectors that inject a pilot fuel and a main fuel, which can be actuated to introduce the pilot fuel separately and independently from the main fuel, there are a set of EQN. 3 and EQN. 4 for the pilot fuel and a set of EQN. 3 and EQN. 4 for the main fuel. EQN. 3 for the pilot fuel may not be a function of GFRP.

$$x_{CD}=f(\text{GFRP},\text{LFRP},P_{cyl},\text{hPW}) \qquad \text{EQN. 3}$$

$$CD=m_{CD}x_{CD}+b_{CD} \qquad \text{EQN. 4}$$

Referring now to fuel trim module 240 in FIG. 3, Eqn. 5 below illustrates the multi-variable function that determines a value ($x_{FTM}$) representative of the fuel trim for the average fuel injector from the family of fuel injectors as a function of gaseous fuel rail pressure (GFRP), liquid fuel rail pressure (LFRP), in-cylinder pressure ($P_{CYL}$) and hydraulic pulse width (hPW). The value ($x_{FTM}$) can be a nominal fuel trim for hydraulic pulse width for the average fuel injector from the family of fuel injectors, or can be a nominal value having dimensions (units) that have no physical meaning but which is correlated, and therefore representative of the nominal fuel trim. Fuel trim (FTM) is a correction factor that scales hydraulic pulse width (hPW) due to variations in fueling from injector to injector when identical hydraulic pulse widths are employed to actuate the injectors. A corrected value for fuel trim (FTM) for a particular fuel injector can be determined by substituting the value ($x_{FTM}$) into EQN. 6, which is a function comprising constants ($m_{FTM}$, $b_{FTM}$) that are characteristic of the particular fuel injector. EQN. 5 represents a relationship for the family of fuel injectors 110, and EQN. 6 represents a relationship for the particular fuel injector. The constants ($m_{FTM}$, $b_{FTM}$) for each fuel injector are determined in the calibration phase during manufacturing. When the family of fuel injectors is the type that are hydraulically actuated direct injectors that inject a pilot fuel and a main fuel, which can be actuated to introduce the pilot fuel separately and independently from the main fuel, there are a set of EQN. 5 and EQN. 6 for the pilot fuel and a set of EQN. 5 and EQN. 6 for the main fuel. EQN. 5 for the pilot fuel may not be a function of GFRP.

$$x_{FTM}=f(\text{GFRP},\text{LFRP},P_{cyl},\text{hPW}) \qquad \text{EQN. 5}$$

$$FTM=m_{FTM}x_{FTM}+b_{FTM} \qquad \text{EQN. 6}$$

Referring now to correction module 250, electronic start of injection (eSOI) and electronic pulse width (ePW) are calculated according to EQNS. 7 and 8 below. Electronic start of injection (eSOI) and hydraulic start of injection (hSOI) have units of crank angle degrees before top dead center, and electronic pulse width (ePW) and hydraulic pulse width (hPW) have units of crank angle degrees in the present disclosure however other units are possible. Closing delay (CD) and fuel trim (FTM) can be combined into a single correction parameter in other embodiments since they both act to adjust hydraulic end of injection (hEOI) seen in FIG. 2. When the family of fuel injectors is the type that are hydraulically actuated direct injectors that inject a pilot fuel and a main fuel, which can be actuated to introduce the pilot fuel separately and independently from the main fuel, there are a set of EQN. 7 and EQN. 8 for the pilot fuel and a set of EQN. 7 and EQN. 8 for the main fuel.

$$eSOI=hSOI+OD \qquad \text{EQN. 7}$$

$$ePW=hPW*FTM+OD-CD \qquad \text{EQN. 8}$$

The multi-variable functions EQN. 1, 3 and 5 can be determined theoretically and empirically. In a preferred embodiment these equations are determined empirically according to the following technique. For a sample set of fuel injectors, from the same family of fuel injectors, fuel injection tests are conducted for each of the injectors for a predetermined number of engine operating conditions by varying at least the following parameters: liquid fuel rail pressure, gaseous fuel rail pressure, in-cylinder pressure and hydraulic pulse width. Preferably, the sample set of injectors are from a lot of fuel injectors obtained from a manufacturing facility. For each of the predetermined engine operating conditions opening delay (OD), closing delay (CD), hydraulic pulse width and actual quantity of fuel injected are measured. Fuel trim (FTM), that is the hydraulic pulse width correction factor, is determined based on the measured quantity of fuel injected, measured hydraulic pulse width, desired quantity of fuel injected and desired hydraulic pulse width. The predetermined engine operating conditions and corresponding measured data form sets of points $\{(\text{GFRP}, \text{LFRP}, P_{cyl}, \text{hPW}, \text{OD})\}$, $\{(\text{GFRP}, \text{LFRP}, P_{cyl}, \text{hPW}, \text{CD})\}$, and $\{(\text{GFRP}, \text{LFRP}, P_{cyl}, \text{hPW}, \text{FTM})\}$ which when plotted in multi-dimensional space form multi-dimensional surfaces respectively. For each of these surfaces, known surface fitting techniques are employed to determine the multi-variable functions EQN. 1, 3 and 5 respectively. In other embodiments instead of employing actual fuel injectors in real physical tests, models of the fuel injector and of the test environment can be employed to determine the sets of points described above. Preferably, the models of the fuel injectors take into consideration dimensional variations due to manufacturing tolerances. In the event that trim information is not provided for an actual fuel injector, for example trim information was not entered during injector replacement in the field, then the values ($x_{OD}$, $x_{CD}$, $x_{FTM}$) can be employed in EQNS. 7 and 8 in place of opening delay (OD), closing delay (CD) and fuel trim (FTM) respectively. The values ($x_{OD}$, $x_{CD}$, $x_{FTM}$) in this situation are normalized to represent the average opening delay, the average closing delay and the average fuel trim for the average fuel injector from the family of fuel injectors. By this technique an actual fuel injector for which trim data is not provided is operated as an average fuel injector, instead of an ideal fuel injector, which statistically reduces fueling errors.

Figure 4:
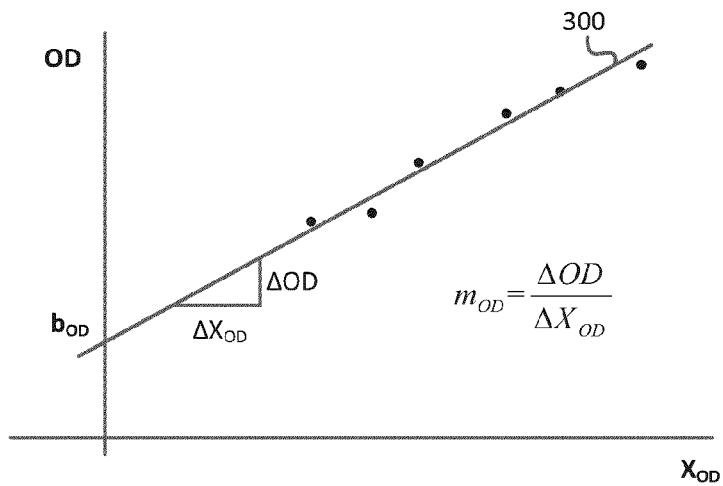
FIG. 4 is a plot of opening delay (OD) for a fuel injector versus a fuel injector family characteristic ($x_{OD}$) representative of a nominal value of opening delay for an average fuel injector from a family of fuel injectors and determined as a function of engine operating conditions.
Figure 5:
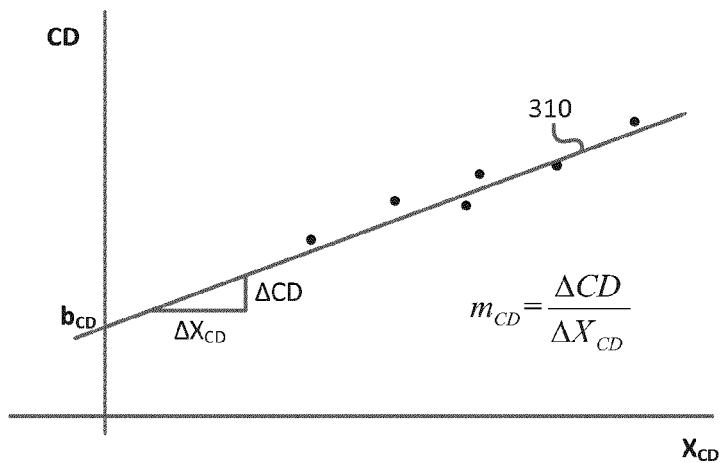
FIG. 5 is a plot of closing delay (CD) for a fuel injector versus a fuel injector family characteristic ($x_{CD}$) representative of a nominal value of closing delay for the average fuel injector from the family of fuel injectors and determined as a function of engine operating conditions.
Figure 6:
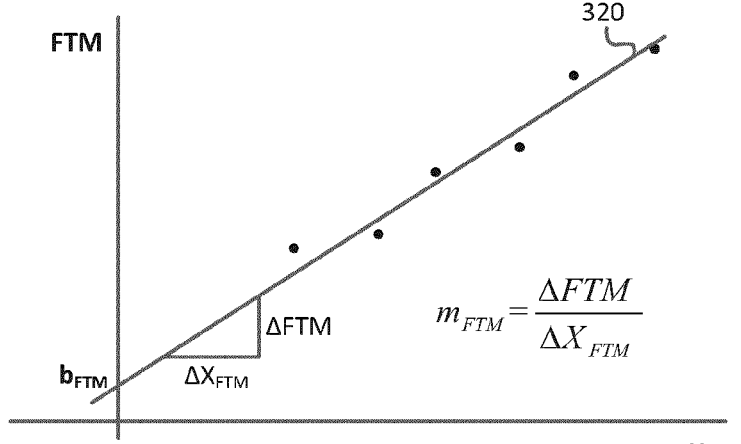
FIG. 6 is a plot of fuel trim (FTM) for a fuel injector versus a fuel injector family characteristic ($x_{FTM}$) representative of a nominal value of fuel trim for the average fuel injector from the family of fuel injectors and determined as a function of engine operating conditions.

Referring now to FIGS. 4, 5 and 6 the derivation of the constants ($m_{OD}$, $b_{OD}$), ($m_{CD}$, $b_{CD}$) and ($m_{FTM}$, $b_{FTM}$) during a calibration procedure in manufacturing will now be described in more detail. After each fuel injector 110 is assembled it can be installed into a testing apparatus (not shown) in which it can be actuated to inject fuel or a fluid with like properties. The testing apparatus comprises equipment and instrumentation to take measurements such that mass flow signal 145a and the actual injected quantity of fuel can be determined. A predetermined number of engine operating conditions are selected, and for each operating condition the fuel injector is actuated and OD, CD and FTM are determined from the measurements taken with the test equipment. The $x_{OD}$, $x_{CD}$ and $x_{FTM}$ values for each of the predetermined engine operating conditions are calculated according to EQN. 1, EQN. 3 and EQN. 5 respectively, and are paired with respective OD, CD and FTM measurements. The pairs of points $(x_{OD}, OD)$, $(x_{CD}, CD)$ and $(x_{FTM}, FTM)$ are assembled into sets $\{(x_{OD}, OD)\}$, $\{(x_{CD}, CD)\}$ and $\{(x_{FTM}, FTM)\}$ respectively, and these sets are plotted in graphs in FIGS. 4, 5 and 6 to illustrate the relationship between the points. Curve fitting techniques are employed to determine the best fit lines 300, 310 and 320 through the sets $\{(x_{OD}, OD)\}$, $\{(x_{CD}, CD)\}$ and $\{(x_{FTM}, FTM)\}$ respectively. For each of the lines 300, 310 and 320 the slopes ($m_{OD}$, $m_{CD}$, $m_{FTM}$) and y-intercepts ($b_{OD}$, $b_{CD}$, $b_{FTM}$) are determined and stored on recording apparatus 160, as seen in FIG. 1, of fuel injector 110. In some preferred embodiments, recording apparatus 160 for each fuel injector 110 is encoded with slopes ($m_{OD}$, $m_{CD}$, $m_{FTM}$) and y-intercepts ($b_{OD}$, $b_{CD}$, $b_{FTM}$) characteristic for that fuel injector. Recording apparatus 160 can be a bar code, a memory or an integrated circuit, as well as other components capable of storing information such that the information can be retrieved or displayed. The slopes ($m_{OD}$, $m_{CD}$, $m_{FTM}$) and y-intercepts ($b_{OD}$, $b_{CD}$, $b_{FTM}$) are employed in EQNS. 2, 4 and 6 during operation of the engine to determine opening delay (OD), closing delay (CD) and fuel trim (FTM) as a function of engine operating conditions (GFRP, LFRP, $P_{CYL}$, hPW).

It is noteworthy to mention that, in other embodiments, lines 300, 310 and 320 can have shapes other than straight lines, such as lines that are parabolic or hyperbolic in shape, or lines that require a more complex polynomial or other functions to represent them. Factors influencing the shape of lines 300, 310 and 320 are the size of the sets $\{(x_{OD}, OD)\}$, $\{(x_{CD}, CD)\}$ and $\{(x_{FTM}, FTM)\}$, the number of variables in the multi-variable functions EQNS 1, 3 and 5 and the characteristics of the family of fuel injectors for which calibration is performed, and therefore coefficients other than slope and y-intercept can be determined and stored on recording apparatus 160. In general, EQNS 2, 4 and 6 have a representation that is characteristic of the shape of the lines 300, 310 and 320 respectively.

Figure 7:
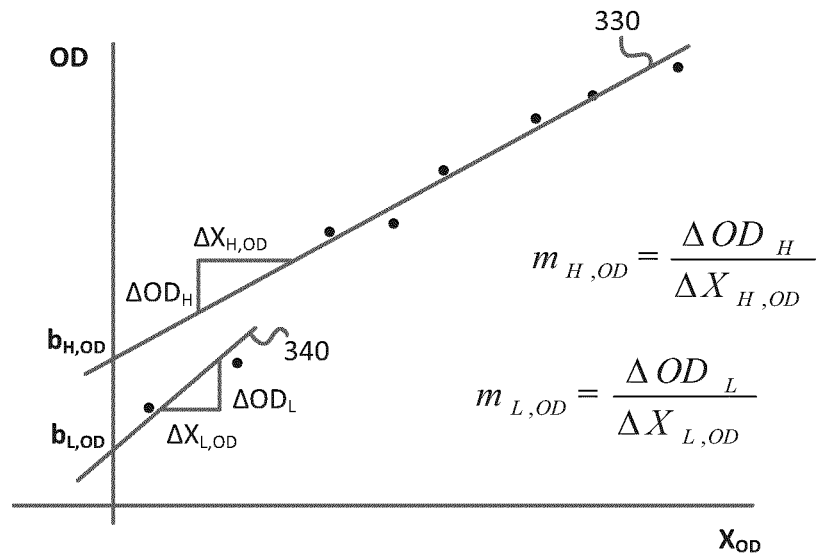
FIG. 7 is a plot of opening delay (OD) for a fuel injector versus a fuel injector family characteristic ($x_{OD}$) representative of a nominal value of opening delay for the average fuel injector from the family of fuel injectors showing a low load/speed trend and a high load/speed trend.

Referring now to FIG. 7, a plot of the set $\{(x_{OD}, OD)\}$ is illustrated for another embodiment. There exist similar plots (not shown) for the sets $\{(x_{CD}, CD)\}$ and $\{(x_{FTM}, FTM)\}$. In this embodiment the characteristic behavior of fuel injectors 110 exhibit different trends between low load/speed, such as idle, and high load/speed which refers to a load and speed above low load/speed. Straight line 330 is the best fit line for the set $\{(x_{OD}, OD)\}$ at high load/speed and is characterized by slope $m_{H,OD}$ and y-intercept $b_{H,OD}$ according to EQN. 9. Straight line 340 is the best fit line for the set $\{(x_{OD}, OD)\}$ at low load/speed and is characterized by slope $m_{L,OD}$ and y-intercept $b_{L,OD}$ according to EQN. 10. Opening delay (OD) for a particular fuel injector at high load/speed can be determined by substituting the value $(x_{OD})$ from EQN. 1 into EQN. 9, and opening delay (OD) at low load/speed can be determined by substituting the value $(x_{OD})$ from EQN. 1 into EQN. 10. There are corresponding equations for closing delay (CD) and fuel trim (FTM).

$$OD_H = m_{H,OD} x_{OD} + b_{H,OD} \qquad \text{EQN. 9}$$

$$OD_L = m_{L,OD} x_{OD} + b_{L,OD} \qquad \text{EQN. 10}$$

Figure 8:
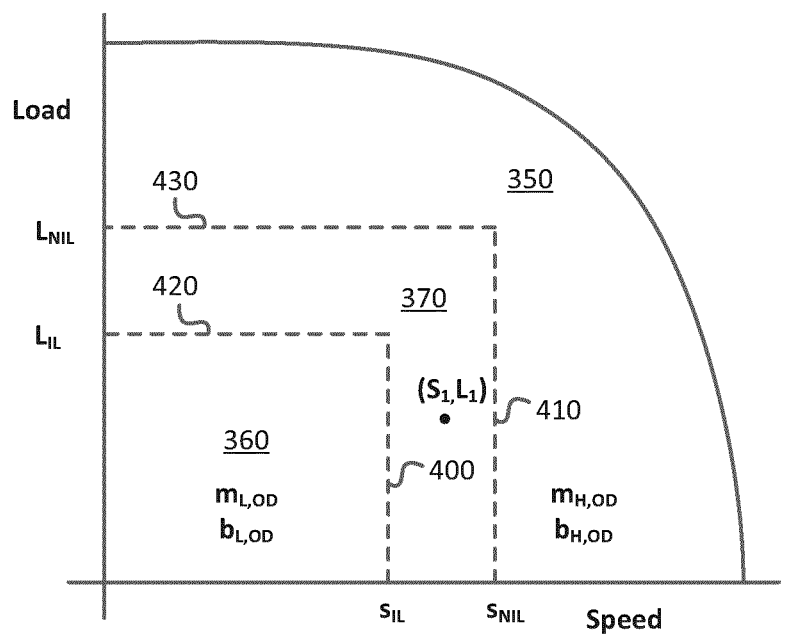
FIG. 8 illustrates a plot of load versus speed illustrating a high load region, a low load region and a transition region for an internal combustion engine employing the fuel system of FIG. 1.

When the engine is operating at a load/speed between low load/speed and high load and/or speed the values for opening delay (OD), closing delay (CD) and fuel trim (FTM) can be interpolated between their low load/speed and high load and/or speed values. A preferred interpolation technique is described herein but there are other known interpolation techniques which can be employed. The plot in FIG. 8 illustrates the regions of the load/speed map for the engine applicable to straight lines 330 and 340. Region 350 is a high load and/or speed region characterized by slope $m_{H,OD}$ and y-intercept $b_{OD}$. Region 360 is a low load/speed region characterized by slope $m_{L,OD}$ and y-intercept $m_{L,OD}$. Region 370 represents a transition region between regions 350 and 360. In a preferred embodiment, the engine spends little time operating in transition region 370, for example 1-2% and is normally operating in region 350. Although FIG. 8 illustrates a two dimensional view, in other embodiments there can be other transition zones between other axes, for example between gas rail pressure and speed, and gas rail pressure and load. Line 400 represents the speed idle limit ($S_{IL}$) and line 410 represents the speed non-idle limit ($S_{NIL}$), the region between lines 400 and 410 represents the speed transition region associated with transition region 370. Line 420 represents the load idle limit ($L_{IL}$) and line 430 represents the load non-idle limit ($L_{NIL}$), the region between lines 420 and 430 represents the load transition region associated with transition region 370. When operating at a load/speed point in region 370, for example at point $(S_1, L_1)$ in FIG. 8, the following technique can be performed to determine opening delay (OD), closing delay (CD) and fuel trim (FTM). The fraction that point $(S_1, L_1)$ has entered speed transition region from speed idle limit ($S_{IL}$) and the fraction that point $(S_1, L_1)$ has entered load transition region from load idle limit ($L_{IL}$) are calculated according to EQNS. 11 and 12 below respectively. A fractional value from EQNS. 11 and 12 that is less than zero is interpreted as zero, and when more than two axes are employed (load, speed, gas rail pressure) a fractional value that is greater than one is interpreted as one. Of the two fractions $F_S$ and $F_L$ maximum fractional value $F_M$ is selected according to EQN. 13. Opening delay (OD), closing delay (CD) and fuel trim (FTM) are then calculated according to EQNS. 14, 15 and 16. Values $x_{OD}$, $x_{CD}$ and $x_{FTM}$ are determined according to EQNS. 1, 3 and 5, based on engine operating conditions at point $(S_1, L_1)$, such that opening delays ($OD_L$, $OD_H$), closing delays ($CD_L$, $CD_H$) and fuel trims ($FTM_L$, $FTM_H$) in EQNS. 14, 15 and 16 can be determined. In EQN. 14, $OD_L$ is the opening delay corresponding to the value $x_{OD}$ in low load and speed region 360, and $OD_H$ is the opening delay corresponding to the value $x_{OD}$ in high load and/or speed region 350. In EQN. 15, $CD_L$ is the closing delay corresponding to the value $x_{CD}$ in low load and speed region 360, and $CD_H$ is the closing delay corresponding to the value $x_{CD}$ in high load and/or speed region 350. In EQN. 16, $FTM_L$ is the fuel trim corresponding to the value $x_{FTM}$ in low load and speed region 360, and $FTM_H$ is the fuel trim corresponding to the value $x_{FTM}$ in high load and/or speed region 350.

$$F_S = \frac{S_1 - S_{IL}}{S_{NIL} - S_{IL}} \qquad \text{EQN. 11}$$

$$F_L = \frac{L_1 - L_{IL}}{L_{NIL} - L_{IL}} \qquad \text{EQN. 12}$$

$$F_M = \max(F_S, F_L) \qquad \text{EQN. 13}$$

$$OD = OD_L + F_M \times (OD_H - OD_L) \qquad \text{EQN. 14}$$

$$CD = CD_L + F_M \times (CD_H - CD_L) \qquad \text{EQN. 15}$$

$$FTM = FTM_L + F_M \times (FTM_H - FTM_L) \qquad \text{EQN. 16}$$

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for correcting injection behavior of a fuel injector that injects a gaseous fuel in an internal combustion engine comprising:
   (a) conducting a fuel injector family calibration phase for a family of fuel injectors, said family calibration phase comprising:
      (i) operating a set of fuel injectors from said family at a first predetermined number of engine operating conditions, each engine operating condition defined by a gaseous fuel rail pressure, a liquid fuel rail pressure and a cylinder pressure; and
      (ii) determining a multi-variable function of said gaseous fuel rail pressure, said liquid fuel rail pressure and said cylinder pressure based on measurements of performance of said set of fuel injectors, said multi-variable function determining a nominal value of a fuel injector family characteristic based on said gaseous fuel rail pressure, said liquid fuel rail pressure and said cylinder pressure;
   (b) conducting a fuel injector calibration phase prior to installation of said fuel injector in said internal combustion engine, said fuel injector calibration phase comprising:
      (i) operating a fuel injector from said family of fuel injectors at a second predetermined number of engine operating conditions; and
      (ii) determining a function of said nominal value based on measurements of performance of said fuel injector, said function of said nominal value determining a corrected value of said fuel injector family characteristic for said fuel injector;
   (c) conducting a fuel injector trimming phase during operation in said internal combustion engine, said trimming phase comprising:
      (i) operating said fuel injector at an engine operating condition;
      (ii) calculating said nominal value of said fuel injector family characteristic from said multi-variable function of said gaseous fuel rail pressure, said liquid fuel rail pressure and said cylinder pressure;
      (iii) calculating said corrected value of said fuel injector family characteristic from said function of said nominal value; and
      (iv) employing said corrected value when actuating said fuel injector to inject said gaseous fuel.

2. The method of claim 1, wherein said gaseous fuel is a main fuel, and said fuel injector family calibration phase, said fuel injector calibration phase and said fuel injector trimming calibration phase are conducted for a pilot fuel and for said main fuel.

3. The method of claim 1, wherein said fuel injector family calibration phase further comprises, for each fuel injector and engine operating condition:
   (iii) measuring performance of said fuel injector when injecting; and
   (iv) determining an actual value of said fuel injector family characteristic as a function of said measurements of said performance;
   (v) grouping said engine operating conditions and said actual values for each fuel injector into a set of points; and
   (vi) determining said multi-variable function by employing surface fitting techniques on said sets of points.

4. The method of claim 1, wherein said fuel injector calibration phase further comprises, for each engine operating condition:
   (iii) measuring performance of said fuel injector when injecting;
   (iv) determining an actual value of said fuel injector family characteristic as a function of said measurements of said performance;
   (v) calculating said nominal value of said fuel injector family characteristic from said multi-variable function;
   (vi) grouping said actual value and said nominal value for each engine operating condition into a set of points;
   (vii) determining said function of said nominal value by employing curve fitting techniques on said set of points;
   (viii) determining parameters representative of said function of said nominal value; and
   (ix) associating said parameters with said fuel injector.

5. The method of claim 1, wherein said fuel injector injects accurately metered quantities of said gaseous fuel and a liquid fuel.

6. The method of claim 1, wherein each engine operating condition is further defined by a hydraulic pulse width.

7. The method of claim 1, wherein said fuel injector family characteristic is one of opening delay, closing delay and hydraulic pulse width correction factor.

8. The method of claim 7, further comprising correcting said injection behavior for said fuel injector by determining corrected values for each of said opening delay, closing delay and hydraulic pulse width correction factor.

9. The method of claim 1, wherein said function of said nominal value comprises a first equation of a first line representative of a relationship between said nominal value and said corrected value.

10. The method of claim 9, wherein said first equation of said first line is characterized by coefficients associated with said fuel injector.

11. The method of claim 9, wherein said first equation is an equation for a straight line characterized by coefficients comprising a slope and a y-intercept.

12. The method of claim 11, further comprising determining said slope and said y-intercept during fuel injector calibration and associating said slope and said y-intercept with said fuel injector.

13. The method of claim 9, wherein said function of said nominal value further comprises a second equation of a second line representative of a relationship between said nominal value and said corrected value, said first equation representative of a high load and/or speed region and said second equation representative of a low load and speed region of said engine operating conditions.

14. The method of claim 13, wherein when an engine operating condition is between said low load and speed region and said high load and/or speed region, said method further comprises interpolating between corresponding corrected values in said low load and speed region and said high load and/or speed region to determine said corrected value.

15. An apparatus for correcting injection behavior of a fuel injector that injects a gaseous fuel in an internal combustion engine, the apparatus comprising an electronic controller operatively connected with said fuel injector, wherein said electronic controller is programmed to:
- (a) calculate a nominal value of a fuel injector family characteristic for a family of fuel injectors from a multi-variable function of engine operating conditions defined by gaseous fuel rail pressure, liquid fuel rail pressure and cylinder pressure, said multi-variable function determined in a fuel injector family calibration phase performed at least once for a set of fuel injectors from said family of fuel injectors;
- (b) calculate a corrected value of said fuel injector family characteristic for said fuel injector from a function of said nominal value; said function of said nominal value determined during a fuel injector calibration phase prior to installation of said fuel injector in said internal combustion engine; and
- (c) employ said corrected value when actuating said fuel injector to inject said gaseous fuel.

16. The apparatus of claim 15, wherein said engine operating conditions are further defined by hydraulic pulse width.

17. The apparatus of claim 15, wherein said fuel injector family characteristic is one of opening delay, closing delay and hydraulic pulse width correction factor.

18. The apparatus of claim 15, wherein said electronic controller is further programmed to correct said injection behavior for said fuel injector by determining corrected values for each of said opening delay, closing delay and hydraulic pulse width correction factor.

19. The apparatus of claim 15, wherein said gaseous fuel is a main fuel, and said fuel injector is actuated to introduce a pilot fuel separately and independently from the main fuel.

20. The apparatus of claim 19, wherein said electronic controller is programmed to perform steps (a), (b) and (c) for said pilot fuel and for said main fuel.

* * * * *